Aug. 1, 1961

G. W. PENNEY 2,994,128

APPARATUS FOR ASSEMBLING COLLECTING CELLS
FOR ELECTROSTATIC PRECIPITATORS

Filed Sept. 7, 1956

INVENTOR.
Gaylord W. Penney
BY
HIS ATTORNEYS

INVENTOR.
Gaylord W. Penney

HIS ATTORNEYS

INVENTOR.
Gaylord W. Penney

United States Patent Office 2,994,128
Patented Aug. 1, 1961

2,994,128
APPARATUS FOR ASSEMBLING COLLECTING CELLS FOR ELECTROSTATIC PRECIPITATORS
Gaylord W. Penney, % Carnegie Institute of Technology, Schenley Park, Pittsburgh, Pa.
Filed Sept. 7, 1956, Ser. No. 608,631
4 Claims. (Cl. 29—241)

This application relates to an apparatus for assembling collecting cells for electrostatic precipitators, more particularly method and apparatus for making a disposable collecting cell for use in electrostatic precipitators.

As is well known, collecting cells in precipitators remove and collect dirt and other solid particles from air or gas passed through an electrostatic precipitator. After the dirt has been collected by the cell, there remains the problem of disposing of this dirt. In my copending application Serial No. 495,265, filed March 18, 1955, now Patent No. 2,875,845, I have described and claimed a collecting cell which is made of low cost materials so that, after the cell has collected a substantial amount of dirt and other solid material from the air, the cell with the dirt adhering to it can be thrown away. This application is directed to an apparatus for making such a cell.

In my said copending application, I disclose a collecting cell having plates made of a variety of low cost materials such as electric insulating material to which a conductive coating has been applied, for example, stiff paper or cardboard which has been coated with metal foil or an electrically conductive varnish or paint, electrically conductive paper or cardboard, or thin metal sheets. The plates are spaced from each other by slender insulators (insulators which are long relative to their cross-sectional area) and arranged so that their central axes form an acute angle with the surfaces of the plates. In this construction, the length of the portions of the insulators between the plates is sufficiently long relative to the direct distance between adjacent plates that the insulators provide sufficient creep, i.e., distance along the surface of an insulator in the direction of current flow, to prevent sparkover. The insulators are made of relatively fine threads of nonhygroscopic, nonconducting material such as nylon, waxed or shellacked cotton, silk, polyethylene, polystyrene, etc.

In the accompanying drawings, I have illustrated certain presently preferred embodiments of my invention, in which.

Figure 1:
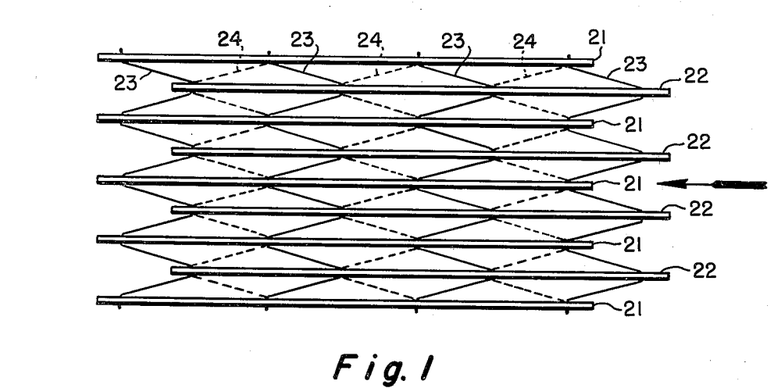
FIGURE 1 is a front side view of a collecting cell such as is described and claimed in my copending application Serial No. 495,265 and which is to be made by the method and apparatus disclosed in this application.

Referring to FIGURE 1 of the drawings, a collecting cell, such as is described in my copending application Serial No. 495,265, now Patent No. 2,875,845 and which is to be made by the method and apparatus hereinafter described and claimed, comprises two alternating sets of collecting plates, ground plates 21 and high voltage plates 22. There may be any number of such plates and they may have any size.

The ground and high voltage plates must be maintained parallel to each other and spaced apart from each other so that a uniform high electrostatic field can be maintained between the ground plates and the high voltage plates. In the cell shown in FIGURE 1, the plates are spaced from each other by two sets 23 and 24 of nonhygroscopic, nonconducting threads. As shown in FIGURE 1, these threads form an acute angle with the surfaces of the plates so that the length of the portions of the threads between the plates is sufficiently long relative to the distance between the plates to prevent sparkover along the threads.

The threads are secured to the plates by passing them through a series of holes punched in the plates. The holes in each series are spaced a uniform distance from each other across the plates and each series is spaced from the other series a uniform distance lengthwise of the plates. The number of holes in each series and the number of series of holes depends on the structural strength of the plates. For simplicity, I have illustrated only two holes in each series and four series. The holes have the same spacing in both the ground plates and the high voltage plates and the series of holes in the ground plates have been designated in the drawings as 26, 27, 28, and 29 and those in the high voltage plates as 26a, 27a, 28a, and 29a.

Referring again to FIGURE 1, the direction of air flow through the cell is indicated by an arrow and thus it will be seen that the high voltage plates 22 are staggered in a direction parallel to the air flow with reference to the ground plates 21. It will also be seen that, although the holes 26 to 29, inclusive, are spaced the same on both sets of plates, due to the staggering of the two sets of plates the two sets of threads 23 and 24 pass in a zigzag fashion through both sets of plates. After the threads have been passed through the plates, the threads are secured to the outer ground plates 21 by securing their free ends to the outer surfaces of the outer ground plates by adhesive.

Figure 2:
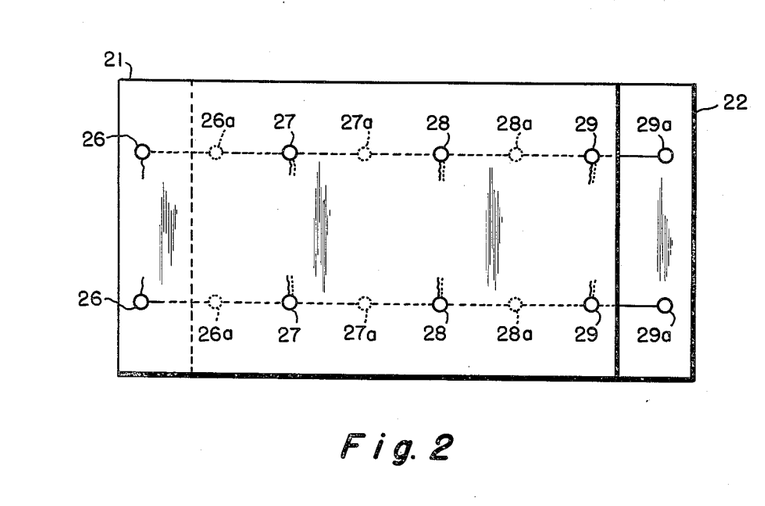
FIGURE 2 is a plan view of the collecting cell shown in FIGURE 1.
Figure 3:
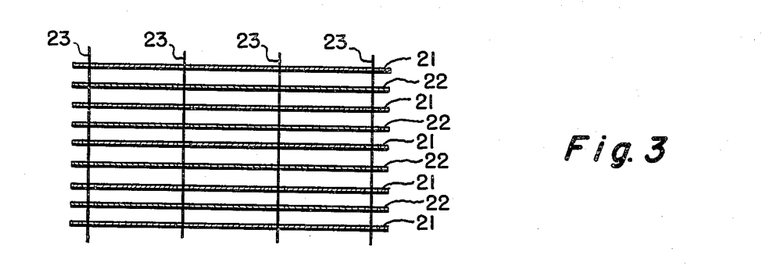
FIGURES 3, 4, 5, and 6 are diagrammatic views illustrating steps performed in carrying out my method of making the cell.

FIGURES 3 to 6, inclusive, illustrate diagrammatically the steps of the method which I have invented for manufacturing the cell shown in FIGURES 1 and 2. The plates 21 and 22 are first spaced parallel to but spaced from each other in the position which they will have in the assembled cell, except that the holes 26 to 29, inclusive, of the ground plates are in line with the holes 26a to 29a, inclusive, of the high voltage plates, as shown in FIGURE 3. The set of threads 23 is then passed through the holes in all of the plates.

Figure 4:
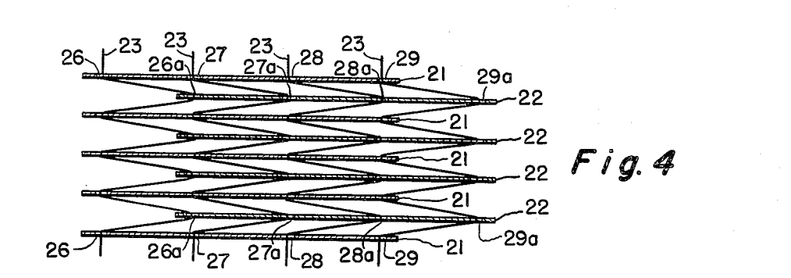
Figure 5:
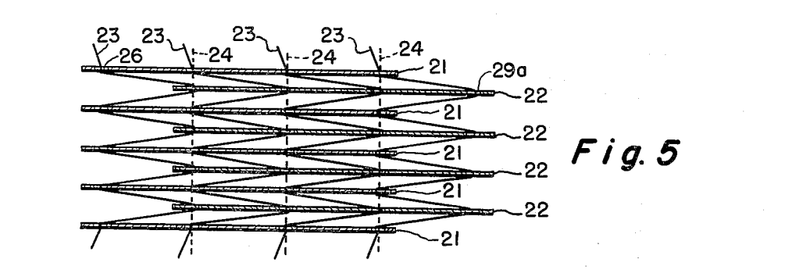

FIGURE 4 illustrates the third step in assembling the collecting cell. In this step, the high voltage plates 22 are moved parallel to the ground plates 21 a distance equal to the space between the series of holes 26 to 29, inclusive, so that the holes 26a of the high voltage plates 22 are in line with the holes 27 of the ground plates 21, the holes 27a of the high voltage plates 22 are in line with the holes 28 of the ground plates, etc. The second set 24 of nonconductive threads is then passed through the plates from one side to the other, as shown in FIGURE 5. It will be noted that threads 24 are not passed through holes 29a in the high voltage plates or through holes 26 in the ground plates.

Figure 6:
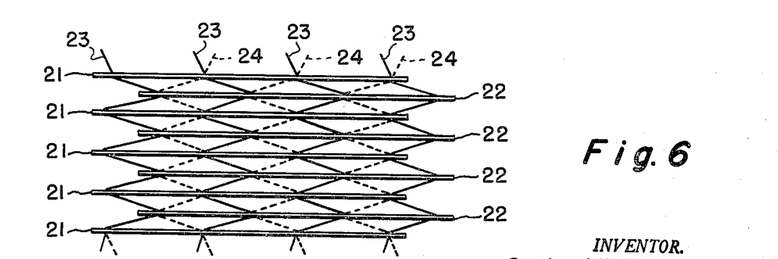

FIGURE 6 illustrates the next step in my method. The high voltage plates are moved parallel to the plates 21 back one-half the distance of the spacing between the holes 26 to 29, inclusive, so that the two sets of plates have the same relative position as they have in the finished cell. The free ends of the threads 23 and 24 are then secured to the outside surface of the outer ground plates 21 by adhesive. When this has been done, the cell is completed except for the attachment of lead wires to the high voltage plates, which last step does not form part of the present invention.

Figure 7:
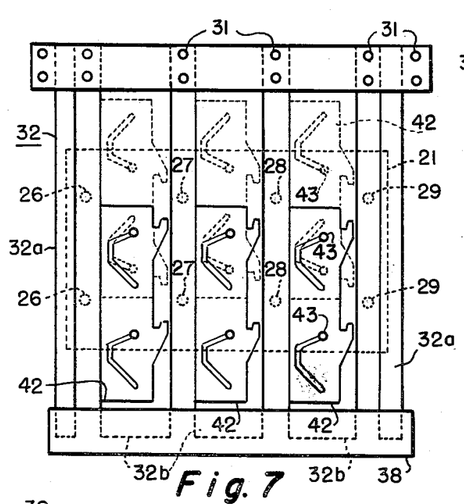
FIGURE 7 is a plan view of a fixture for holding one set of plates in the cell while it is being assembled.
Figure 8:
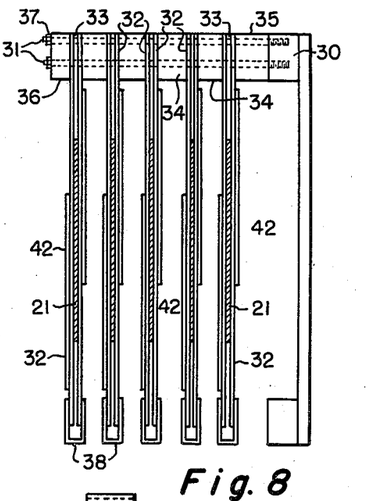
FIGURE 8 is an end view of the fixture shown in FIGURE 7.

FIGURES 7 and 8 show a fixture which is part of the apparatus which I have invented for assembling a collecting cell. The fixture holds the ground plates 21 in position for carrying out the operations just described. The fixture comprises a base 30 from which a series of threaded bolts 31 extend vertically. A series of flat elongated fingers 32 are passed over the bolts 31 adjacent the end of each finger. Spacer blocks 33 and 34 position the fingers relative to each other on the bolts 31. The spacer blocks 33 are inserted between each of two fingers 32 and have a thickness approximating that of the plates 21 so that a plate can be held between each pair of fingers 32. The blocks 34 are inserted between each pair of fingers and have a thickness such that ground plates 21 held between a series of pairs of fingers in the fixture are spaced from each other the same distance as they will be spaced from each other in the finished cell. A spacer block 35 on the rods 31 and next to the base 30 positions the plates vertically from the base 30 and a block 36 and nuts 37 on the bolts 31 hold the top pair of plates and all of the other pairs of plates on the base.

After a ground plate has been inserted between each pair of fingers in the fixture, spring clips or clamps 38 are slipped over the free ends of each pair of fingers so as to firmly hold a plate 21 between each pair of fingers.

Referring to FIGURE 7, it will be seen that each ground plate is held by several fingers and that the pairs of fingers are not of the same width. The width of the fingers varies so as to cover substantially all of the area of the ground plates 21 except for narrow transversely extending strips of exposed plate surface adjacent the holes 26 to 29, inclusive. Thus, the outer pairs of strips 32a cover the portion of the plates between the ends of the plates and the first series of holes spaced inwardly from the ends of the plates. The intermediate pair of fingers 32b are slightly less in width than the spacing lengthwise of the plates between the series of holes 26, 27, 28, and 29. By this arrangement, the plates are supported when the threads 23 or 24 are passed through these holes.

Figure 9:
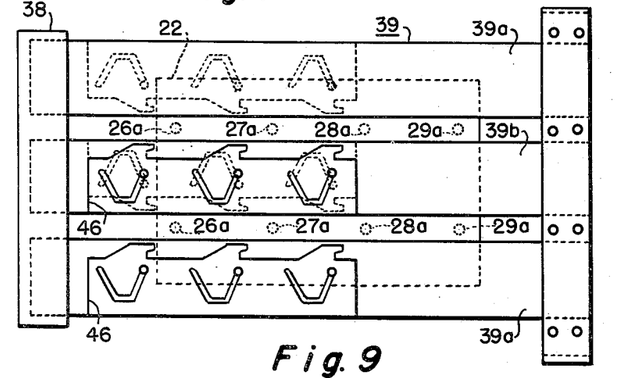
FIGURE 9 is a plan view of a fixture used for holding a second set of plates of the collecting cell while it is being assembled.
Figure 10:
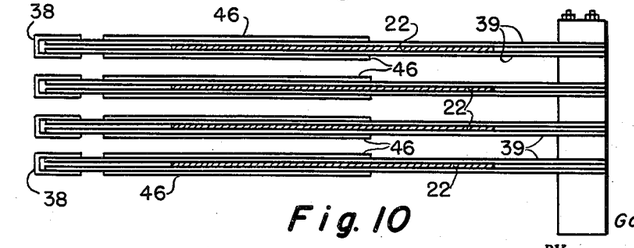
FIGURE 10 is a side view of the fixture shown in FIGURE 9.

FIGURES 9 and 10 show a fixture which forms a part of my apparatus and which is used for supporting the high voltage plates 22 during the assembling operation. This fixture is substantially the same as the fixture for holding the ground plates except that it has one pair of fingers less than the number of pairs of fingers embodied in the fixture for the ground plates, and the fingers in this fixture extend lengthwise of the plates. Outer pairs of fingers 39a extend over an area adjacent to the thread holes in the high voltage plates between these holes and the sides of the plates. Intermediate pairs of fingers 39b extend longitudinally of the plates and cover the areas between the holes in each series. Thus, the high voltage plates are supported when the threads 23 or 24 are inserted through these holes.

After high voltage plates 22 have been inserted between each pair of fingers 39, the free ends of each pair of fingers are held together by spring clips or clamps 38.

Figure 11:
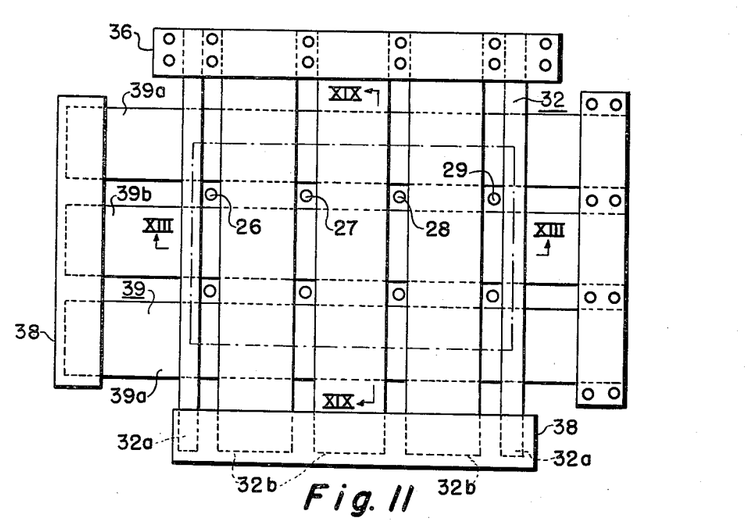
FIGURE 11 is a plan view showing the fixtures of FIGURES 7 and 9 in one operating position, portions of the apparatus being removed for clarity.
Figure 13:
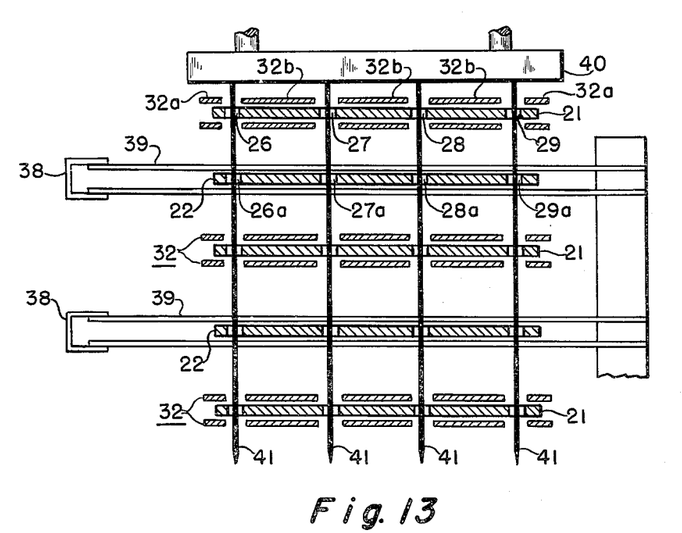
FIGURE 13 is a vertical section along the lines XIII—XIII of FIGURE 11, with certain portions omitted for the purposes of clarity and showing the plates of the collecting cell in position for the first step in assembling the cell.

FIGURE 11 shows the two fixtures in operative position to carry out the first step of my method for forming a collecting cell. Fingers 39 holding the high voltage plates are inserted between the pairs of fingers 32 holding the ground plates. As appears in FIGURE 11, the fingers of the two fixtures extend at right angles to each other. Referring back to FIGURE 9, it will be seen that the fingers 32 extend across the ground plates whereas the fingers 39 extend longitudinally of the high voltage plates, so that, when the two fixtures are placed together as shown in FIGURE 11, the ground plates and high voltage plates are superimposed one upon the other. When the fixtures are in the position shown in FIGURE 11, the holes 26 to 29, inclusive, in the ground plates are in vertical alignment with the holes 26a to 29a, inclusive, of the high voltage plates, as shown in FIGURE 13. (For simplicity of illustration, I have shown only three ground plates and two high voltage plates in FIGURE 13.)

With the ground and high voltage plates in the position shown in FIGURE 13, the set 23 of nonconductive threads is inserted from one side of the cell to the other. This can be done in one operation by using a gang needle 40 having a needle 41 for each of the holes in the cell plates.

Figure 12:
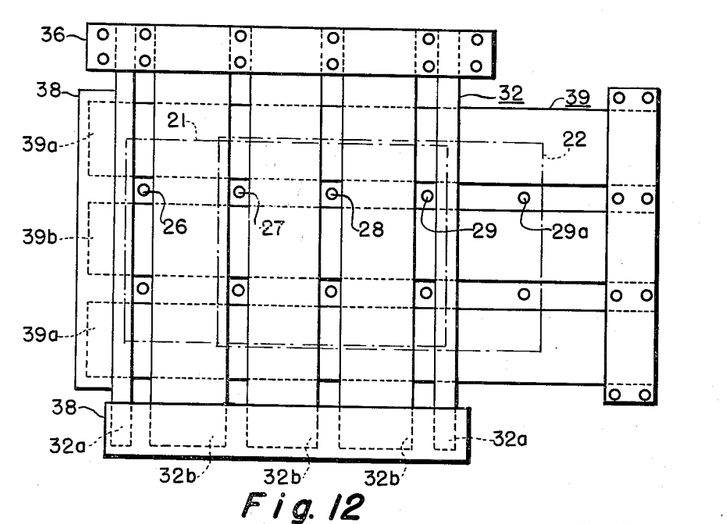
FIGURE 12 is a plan view similar to FIGURE 11, but showing the fixtures of FIGURES 7 and 9 in a different operating position.
Figure 14:
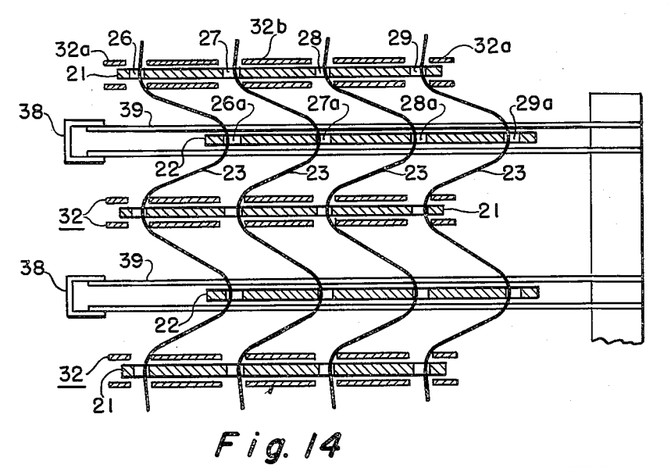
FIGURES 14, 17, and 18 are views similar to FIGURE 13 illustrating succeeding steps in my method of assembling the collecting cell, FIGURE 17, however, having certain operating portions added.

The fixture holding the high voltage plates is then moved so that the two fixtures for the two series of plates occupy the position relative to each other which is shown in FIGURES 12 and 14. When this is done, the holes 26a of the high voltage plates are in vertical alignment with the holes 27 of the ground plates 21, and the threads 23 are pulled sidewise, as shown in FIGURES 4 and 14.

With the ground and high voltage plates in the position shown in FIGURES 4 and 14, the set of threads 24 is passed through the holes of all of the plates which are in vertical alignment from one side of the cell to the other (see FIGURE 5). Referring to FIGURE 5, it will be seen that the threads 24 do not pass through the holes 29a on the leading edge (in the direction of movement of the high voltage plates). Likewise, they do not pass through the holes 26 in the ground plates 21 at the end of the ground plates farthest from the high voltage plates.

After the threads 24 have been inserted through all of the holes which are in alignment with holes in all of the other plates, the high voltage plates are then moved back one-half the distance between the holes 26 to 29, inclusive, to the position shown in FIGURE 6 of the drawings. The ends of the threads 23 and 24 are then secured by adhesive or otherwise to the outside surface of the outer ground plates 21.

Figures 15, 16, 17, 18:
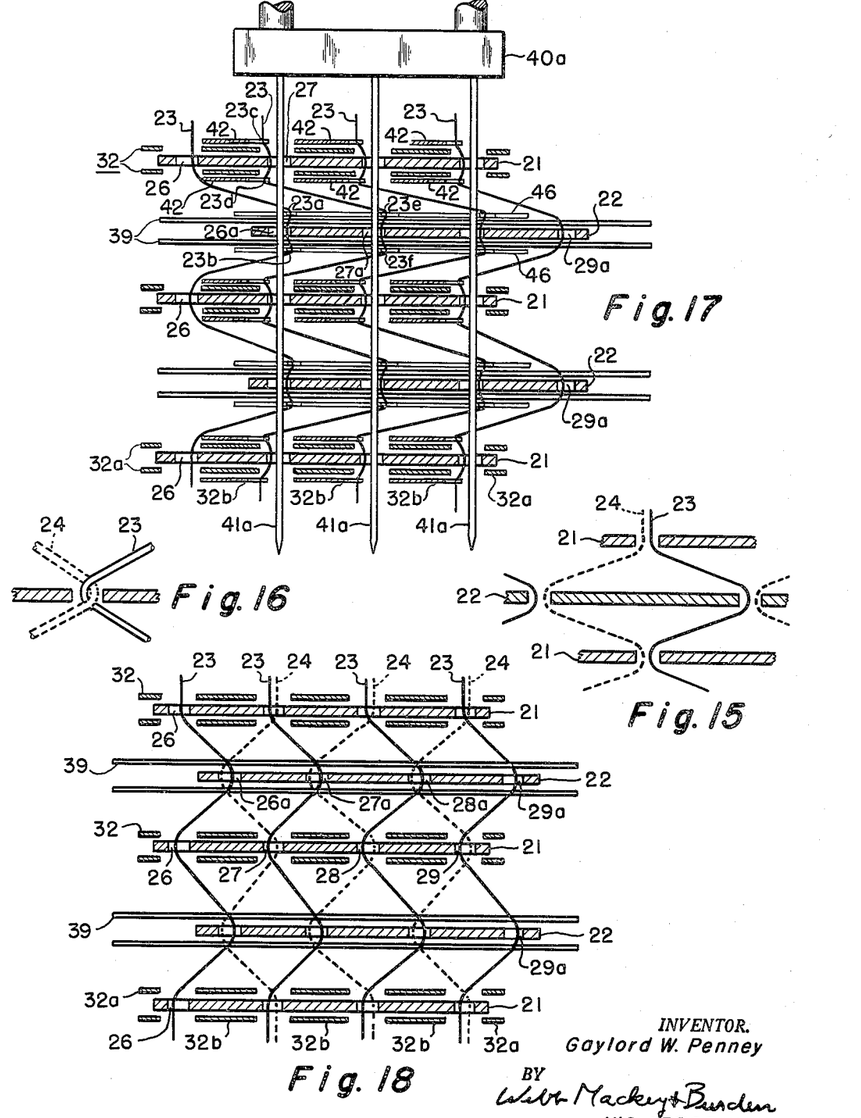
FIGURES 15 and 16 are fragmentary vertical sections similar to FIGURE 18 but on an enlarged scale.

Referring to FIGURE 15, which is a fragmentary section on an enlarged scale showing two ground plates 21 and one high voltage plate 22, it will be seen that the two sets of threads 23 and 24 engage opposite edges of the plates. One of the features of the collecting cell which I have invented and which is shown in my co-pending application Serial No. 495,265 is its low cost which may require the use of inexpensive, rather thin paper stock for the plates. During the manufacturing steps described above, when the two sets of plates are moved relative to each other, the threads will rub against the edges surrounding the holes in the plates and, if a relatively light paper stock is used for the plates, there is a real possibility that the threads will tear or cut into the paper. Accordingly, I propose to loop the threads 23 and 24 around each other within each of the holes where two threads pass through the same hole, as shown in FIGURE 16, so that the threads pull on each other rather than against the edge of the plates, and my apparatus includes a looping mechanism for the threads.

The looping mechanism is used after the steps shown in FIGURES 4 and 14 have been completed. Referring to FIGURE 14, it will be seen that, when the high voltage plates 22 are moved so as to line up the holes 26a in the high voltage plates with the holes 27 in the ground plates 22, the holes 27a with the holes 28, etc., the threads 23 are pulled against the right-hand edges of the holes in the ground plates and against the left-hand edges of the holes in the high voltage plates (viewing FIGURE 14). In order to loop the sets of threads 23 and 24 around each other, as shown in FIGURE 16, it is necessary to move the threads 23 to the opposite sides of those holes of all plates through which two threads are passed prior to insertion of the threads 24.

Figure 19:
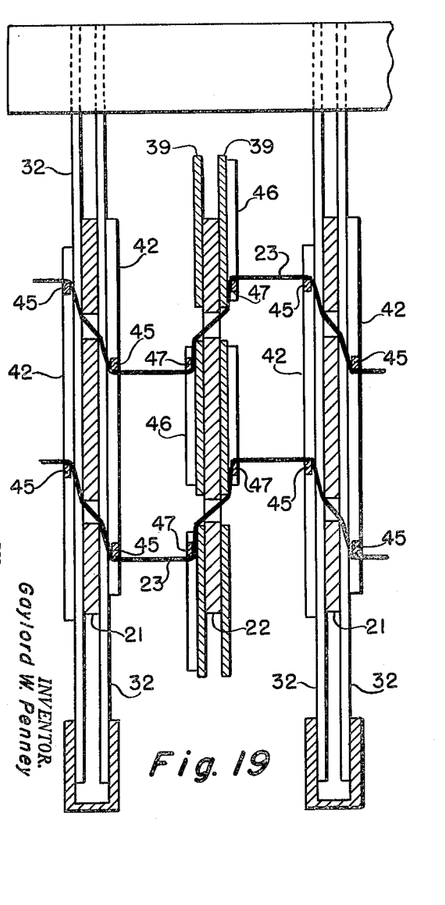
FIGURE 19 is a vertical section along the lines XIX—XIX of FIGURE 11 with certain operating portions added.

Accordingly, I provide mechanism which will move the threads 23 into the position shown in FIGURE 17, in which it will be noted that the threads have been pulled over to the left side of the holes of the ground plates 21 except in the holes 26 through which only the threads 23 are passed. The threads 23 have been pulled not only over to one edge of the holes in the plates but also, as shown in FIGURE 19, the portions of the threads 23 adjacent each side of the holes in the plates have been pulled crosswise of the plates for a short distance along the surfaces of the plates. Likewise, the threads 23 are pulled to the right-hand edge of the holes in the high voltage plates 22 except in the holes 29a through which only the threads 23 pass.

After the threads 23 have been moved to the position shown in FIGURE 17, needles 41a of a gang needle 40a are passed through all plates having holes in alignment with holes in all other plates to insert threads 24. Thereupon, the high voltage plates 22 are moved to the left (viewing FIGURE 17) to the position shown in FIGURES 6 and 18. Referring to FIGURE 18, it will be seen that the two sets of threads 23 and 24 are looped around each other within the holes in the plates, as shown in FIGURE 16.

Figure 20:
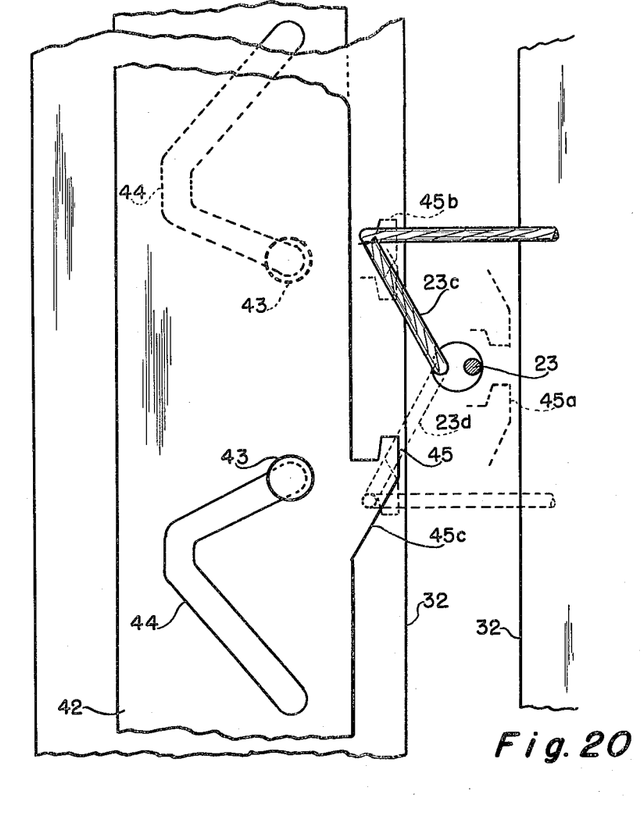
FIGURE 20 is a fragmentary plan view of apparatus shown in FIGURE 7 to illustrate the operation of one of the parts of the fixture shown in FIGURE 7.
Figures 21, 24, 25:
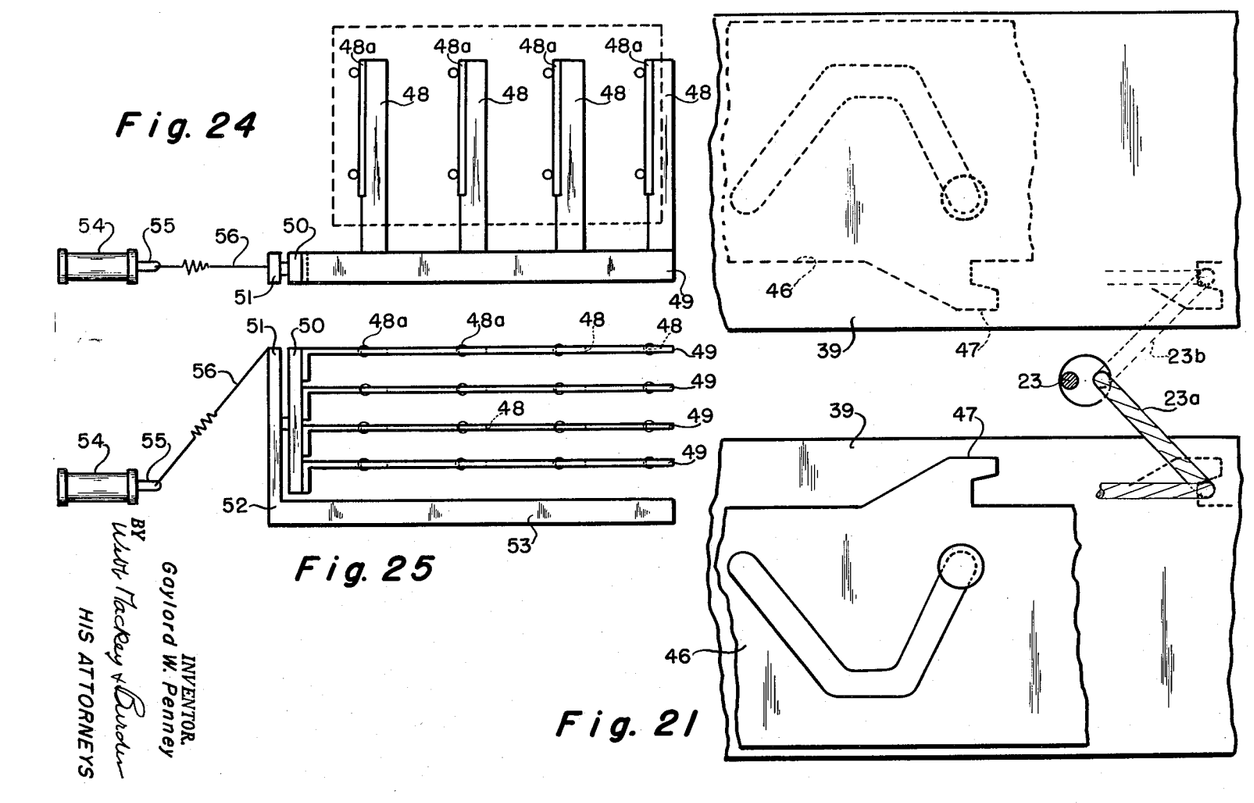
FIGURE 21 is a fragmentary plan view of apparatus shown in FIGURE 9 to illustrate the operation of one of the parts of the fixture shown in FIGURE 9.
FIGURE 24 is a plan view of auxiliary equipment which is used with my apparatus.
FIGURE 25 is a front elevation of the apparatus shown in FIGURE 24.

FIGURES 20 and 21 show the looping mechanism for moving the threads 23 into the position shown in FIGURES 17 and 19. Hook plates 42 extend lengthwise of each pair of fingers 32 in the fixture for holding the ground plates. They are positioned above and below each pair of fingers, as shown in FIGURES 7-10, inclusive, and 17, and, while secured to the fingers, can be moved along the fingers. This is accomplished by rivets 43 secured to the fingers 32 and passing through slots 44 which extend first diagonally across the hook plates 42, then longitudinally of the hooks for a short distance and then diagonally back across the hook plates, as shown in FIGURE 20. When the hook plates are moved relative to the fingers 32, the plates move along the fingers 32 and transversely to the fingers 32 under the guidance of the rivets 43 in the slots 44, then longitudinally of the fingers and finally both longitudinally and transversely, the second transverse movement being opposite to the first. The hook plates 42 have hooks 45 which extend outwardly from one edge and which engage the threads 23 when the hook plates are moved relative to the plates as just noted. Thus, viewing the top hook plate in FIGURE 20, the hook 45 moves first to the position 45a (indicated in chain lines), then longitudinally of the finger 32 on which the hook plate is mounted to engage the thread 23, and finally to the position 45b (indicated in chain lines), thereby pulling the thread 23 as shown at 23c. As noted, the hook plates are placed above and below each pair of fingers, but the upper and lower hook plates are reversed; that is, they are moved in opposite directions along the fingers 32 but moved transversely relative to the fingers in the same direction. In FIGURE 20, the hook plates on top of a pair of fingers are shown in solid lines and the hook plates below a pair of fingers are shown in dotted lines. The hook plates below the fingers pull the threads 23 as shown at 23d.

After the threads 24 are inserted, the hook plates are retracted, following in reverse the same path which they followed to engage the threads 23. Referring to FIGURE 20, it will be seen that the hooks 45 each have a sloping rear face 45c which deflects the threads 23 and 24 away from the hooks 45 so that the hooks will not engage the threads on the reverse movement of the hook plates.

Referring to FIGURE 19, it will be seen that the hooks 45 are thinner than the hook plates 42 so as to provide a clearance for the threads 23 when they are pulled across the upper and lower surfaces of the fingers 32.

Referring to FIGURE 21, the fingers 39 which support the high voltage plates 22 have hook plates 46 which are generally similar in construction and operation to the hook plates 45 on the fingers 32. It should be noted, however, that the hooks 46 above and below the fingers 39 are moved in the same direction. Also, there is no hook plate on the upper surface of the pair of hook plates which are on the right-hand edge of the fixture for the high voltage plates (the top pair of fingers, viewing FIGURE 9).

The threads 23 are pulled across the upper surfaces of the pairs of fingers 39 to the position shown at 23a by hooks 47 on the edges of the hook plates 46 which move relative to the fingers 39 in the same manner as the hooks 45 described with reference to FIGURE 20. Likewise, the threads 23 are moved to the position beneath the fingers 39 to the position shown at 23b by hooks 47 on hook plates 46 secured to the bottom surfaces of the pairs of fingers 39 and moving relative to the fingers in the same manner as the hook plates 44 are secured to and move relative to the bottom surfaces of the pairs of fingers 32.

Figure 22:
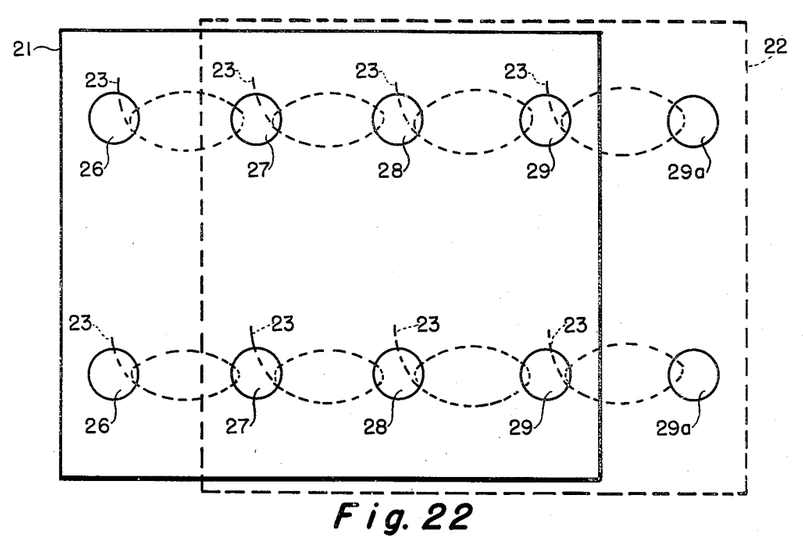
FIGURE 22 is a schematic plan view of FIGURE 14.
Figure 23:
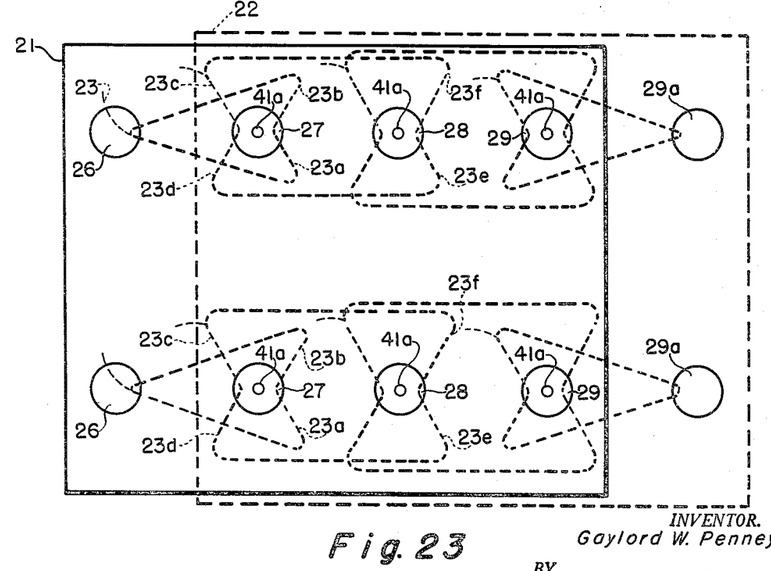
FIGURE 23 is a schematic plan view of FIGURE 17.

FIGURES 22 and 23 are schematic plan views of FIGURES 14 and 17, respectively, further illustrating the action of the hook plates 42 and 46. Referring first to FIGURE 22, it illustrates the path of the threads 23 when the ground and high voltage plates are in the position shown in FIGURE 14. Referring first to the left-hand vertical pair of holes 26 which are in the ground plates 21, it will be seen that the threads 23 pass downwardly through the top ground plate (viewing FIGURE 14), then to the right and through the hole 26a in the first high voltage plate and then over to the left and through a hole 26 in the middle ground plate 21 shown in FIGURE 14. The threads 23 follow this same path back and forth between the holes 27 to 29, inclusive, in the ground plates 21 and in the holes 27a to 29a, inclusive, in the high voltage plates 22.

Referring now to FIGURE 23 and comparing it with FIGURES 17, 20, and 21, it will be seen that the action of the hook plate 46 above the top high voltage plate 22 is to pull the thread 23 just before it passes through the hole 26a in that high voltage plate over to the position 23a (see FIGURES 17, 21, and 23). The thread then passes through the hole 26a in the top high voltage plate 22 and is pulled by the hook-plate 46 beneath the top high voltage plate 22 over to the position 23b (see FIGURES 17, 21, and 23). From the position 23b, the thread then passes through the hole 26 in the second ground plate 21 and so on alternately between high voltage and ground plates through the bottom ground plate 21.

Referring now to the action of the hook plates 42 and 46 on the threads 23 which pass through the holes 27 in the ground plates 21 and comparing FIGURES 17 and 20, it will be seen that the hook plate 42 above the top ground plate 21 moves the thread 23 before it passes through the hole 27 away from a person viewing the figure to the left to the position shown at 23c in FIGURES 20 and 23. The thread then passes through the hole 27. The hook plate 42 beneath the top ground plate moves the thread 23 after it passes through the hole 27 towards a person viewing the figure and to the left to the position shown at 23d (see FIGURES 20 and 23). From the position 23d, the thread moves diagonally between the ground plate 21 and the adjacent high voltage plate 22 in order to pass through the hole 27a in the top high voltage plate 22. Before passing through the hole 27a, however, the thread is diverted toward a person viewing the figure to the position 23e in FIGURE 23, which corresponds to the position 23a in FIGURE 21. The thread then passes through the hole 27a and is diverted by the hook plate 46 beneath the high voltage plate away from a person viewing FIGURES 17 and 23 and to the right to the position shown at 23f in FIGURE 23, which corresponds to the position 23b in FIGURE 21. The thread then proceeds diagonally over to the hole 27 in the second ground plate 21, being diverted by hook plates on the ground plate in the same manner as the thread was diverted adjacent the hole 27 in the top ground plate 21. The thread then proceeds diagonally over to the hole 27a in the second high voltage plate 22 and so on through the cell.

The action of the hook plates on the threads 23 passing through the holes 28 and 29 of the ground plates 21 and through the holes 28a and 29a of the high voltage plates 22 is the same as that described with reference to the threads 23 in the holes 26 and 27, etc., account being taken, of course, of the fact that only one thread 23 is passed through the holes 29a in the high voltage plates. Referring to FIGURE 23, it will be seen that, when the needles 41a carrying the threads 24 are passed through the holes in the plates, they carry the threads 24 first on one side and then on the other side of the threads 23 as they pass through sucessive plates. This is illustrated also in FIGURE 18.

I have found that, when the high voltage plates are moved from the position shown in FIGURE 3 to the position shown in FIGURES 4 and 5 and from that position back to the position shown in FIGURE 6, a considerable amount of friction develops as the threads are pulled through the holes in the plates. Also, if the high voltage plates are moved too rapidly, there is a tendency for the threads to cut into the plates. I have found that this tendency can be alleviated by vibrating one of the sets of plates. I have also devised a separate mechanism for reducing the tendency of the threads to cut into the plates. This mechanism loosens each thread and gives it some slack while the high voltage plates are being moved. This apparatus is shown in FIGURES 24 and 25 of the drawings.

Essentially, this mechanism comprises means for vibrating the threads and pulling them in the direction in which the plates are moved. I provide arms 48 which extend inwardly from the edges of the plates and between each pair of adjacent plates and are positioned to lightly engage the threads extending between the plates. The edges of the arms which engage the threads are covered by lengths of split plastic tubing 48a to prevent damage to the threads. All of the arms 48 extending between any two pairs of plates are carried by a cross arm 49 which extends transversely to the arms 48 and parallel to the length of the plates. Each of the arms 49 is mounted at one end to a crossplate 50, and this crossplate is connected adjacent its midpoint to the midpoint of a leaf spring 51 mounted at its lower end 52 to a base 53. A solenoid vibrator 54 has an armature 55 connected by a wire 56 to the top of the leaf spring 51. When the solenoid 54 is energized by an alternating voltage, the armature 55 vibrates, which in turn vibrates the leaf spring 51 and all of the arms 48 through the connection between the leaf spring 51 and the crossplate 50. The arms 48 hit the threads between the plates rapidly and pull through a little slack in the threads each time they do so. This relieves the friction between the threads and the plates because, every time the slack in the threads is taken up by moving the high voltage plates, the threads tighten and engage the hooks which pull more slack in the threads by vibrating.

As is known, the plates of collecting cells should be maintained parallel to and spaced uniformly from each other so that a uniform potential gradient can be maintained between the high voltage plates and the ground plates. Accordingly, after a collecting cell has been assembled as described above, it may be desirable to secure the plates to the threads and the threads to each other and thereby secure the plates against slippage along the threads. This may be done by using dielectric threads which have been coated with a thermoplastic adhesive which is hard at room temperature. After the cell has been assembled, it is heated to cause the adhesive to soften so that the threads may adhere to each other and to the plates within or adjacent to the holes in the plates. Thereafter, the cell is cooled in its operative position so that the threads are secured to each other and to the plates.

An alternative method of securing the plates to the threads and the threads to each other is to coat the threads prior to assembly with a dissolvable plastic. After assembly and with the cell in its operative position, a volatile solvent for the plastic is sprayed between the plates to soften the surface of the plastic coating so that the coatings of the threads cut into each other. Thereafter, the solvent is allowed to vaporize and the plastic coating hardens.

The apparatus which I have disclosed for carrying out my method of assembling collecting cells can be operated by hand, or the fixtures for the ground plates and the high voltage plates can be moved relative to each other by suitably timed mechanism which will also actuate the hook plates 42 and 46 and the gang needle 40 in the proper time sequence. By my method and apparatus, it is possible to assemble collecting cells at a relatively high production rate and thereby the cost of the cells is reduced.

While I have described certain presently preferred embodiments of my invention, it is to be understood that it may be otherwise embodied within the scope of the appended claims.

I claim:

1. Apparatus for assembling collecting cells for electrostatic precipitators, said cells having two sets of opposed plates, the plates of one set alternating with the plates of the other set and being spaced parallel to but away from each other by flexible dielectric threads passing through spaced holes in the plates, the portions of the threads between the plates forming an angle with the plates when the cells are in operative position, said apparatus comprising a fixture for holding a first set of said sets of plates, said fixture comprising a plurality of pairs of opposed flat elongated fingers, each pair extending substantially the full extent of one dimension of a plate and holding a plate between them, there being a series of pairs in the same plane, each series holding the same plate and spaced from each other substantially across the plate along the dimension of the plate at right angles to the direction in which the fingers extend, the spacing of the pairs of fingers also exposing the holes in the plate, a common support for each series of pairs of fingers for holding each said series in vertical spaced relationship whereby the plates are spaced from each other in the manner in which they are spaced from each other when the collecting cell is in operative position, and a second fixture for the second of said sets of plates, said second fixture having similar pairs of elements in an arrangement similar to those in the first fixture, said second fixture holding the second set of plates between the first set of plates in the position which the second set of plates has in the collecting cell when in operative position, the fixtures being movable relative to each other whereby holes in the two sets of plates may be aligned with each other and may be staggered with respect to each other, means for inserting threads through the holes in both sets of plates when the holes are aligned, mechanism for moving at least one plate holding means relative to the other set of plate holding means to align and stagger the holes in one set of plates with respect to the holes in the other set of plates, and means for actuating said thread inserting means when the holes in the sets of plates are in alignment with each other.

2. Apparatus as described in claim 1 and having means associated with said pairs of fingers for pulling threads inserted in the holes of the plates to one side of said holes.

3. Apparatus as described in claim 1 in which the fingers have movable hooks on their sides away from the sides which engage the plates for engaging threads passed through the holes in the plates and pulling the threads to one side of the holes.

4. In apparatus for assembling collecting cells for electrostatic precipitators, said cells having two sets of opposed plates, the plates of one set alternating with the plates of the other set and being spaced parallel to but away from each other by flexible dielectric threads passing through spaced holes in the plates, a fixture for holding one of said sets of plates in the position relative to each other which they maintain when the cell is operative comprising a plurality of pairs of flat elongated fingers, each pair being adapted to hold a plate between them, there being a series of pairs lying in the same plane for holding each plate, a support for all the pairs of fingers engaging said fingers adjacent one end of each finger, said support having sufficient rigidity to maintain the pairs of fingers spaced from each other to hold the plates in said operative position relative to each other, the pairs of fingers being arranged side by side in rows of sufficient width to extend substantially across one dimension of the plates but leaving spaces between the pairs to expose the holes in the plates, the fingers having sufficient length to extend across the other dimension of the plates, and movable hooks on the sides of the fingers away from the sides which engage the plates, for engaging threads passed through the holes in the plates and pulling the threads to one side of the holes.

References Cited in the file of this patent

UNITED STATES PATENTS

| | | |
|---|---|---|
| 117,383 | Church | July 25, 1871 |
| 307,178 | Carter | Oct. 28, 1884 |
| 546,421 | Duke | Sept. 17, 1895 |
| 731,665 | Clayton | June 23, 1903 |
| 1,289,607 | Batchelder | Dec. 31, 1918 |
| 1,610,633 | Swanson | Dec. 14, 1926 |
| 1,765,496 | Miller | June 24, 1930 |
| 1,778,889 | Disbro | Oct. 21, 1930 |
| 1,942,459 | Timmons | Jan. 9, 1934 |
| 2,282,750 | Schueler | May 12, 1942 |
| 2,322,380 | Mosley | June 22, 1943 |
| 2,511,730 | McClain | June 13, 1950 |
| 2,640,662 | Te Strake | June 2, 1953 |
| 2,754,862 | Kemp | July 17, 1956 |